US005752157A

United States Patent [19]

Yamashita et al.

[11] Patent Number: 5,752,157

[45] Date of Patent: May 12, 1998

[54] LIQUID FUEL REFORMING APPARATUS

[75] Inventors: Takeshi Yamashita, Nakatsugawa; Hiro Yamashita, 4580-59, Naegi, Gifu, both of Japan

[73] Assignees: Centerfield Kabushiki Kaisha, Aichi; Hiro Yamashita, Gifu, both of Japan

[21] Appl. No.: 662,239

[22] Filed: Jun. 14, 1996

[30] Foreign Application Priority Data

May 27, 1996 [JP] Japan ........ 8-156135

[51] Int. Cl.$^{6}$ ........ B01J 19/08

[52] U.S. Cl. ........ 422/186.01; 210/748

[58] Field of Search ........ 422/186, 186.01; 210/222, 748

[56] References Cited

U.S. PATENT DOCUMENTS

| | | | |
|---|---|---|---|
| 430,462 | 6/1890 | Bull | 422/186.02 |
| 4,326,954 | 4/1982 | Shroyer | 210/222 |
| 4,538,582 | 9/1985 | Wakuta | 123/538 |
| 4,716,024 | 12/1987 | Pera | 422/186.01 |
| 5,236,670 | 8/1993 | Iwata | 422/186.04 |
| 5,348,050 | 9/1994 | Ashton | 137/827 |
| 5,368,705 | 11/1994 | Cassidy | 204/136 |

*Primary Examiner*—Charles T. Jordan
*Assistant Examiner*—John R. Hardee
*Attorney, Agent, or Firm*—Koda and Androlia

[57] ABSTRACT

A liquid fuel reforming apparatus comprising a bobbin main body containing a fuel passage through which a liquid fuel such as gasoline and a combustible gas passes; a coil having a predetermined number of winding formed around the bobbin main body; and a multi-faced magnetic metal material sealed in the fuel passage, which permits passage of the liquid fuel being brought into contact therewith; wherein the liquid fuel is adapted to be reformed by applying a predetermined voltage across the coil to induce a magnetic field and effect magnetization of the multi-faced magnetic metal material contained in the fuel passage and by allowing the liquid fuel to flow through the fuel passage in contact with the magnetized multi-faced magnetic metal material. The multi-faced magnetic metal material may be replaced with a multi-faced material of an amorphous metal alloy.

12 Claims, 3 Drawing Sheets

FIG. 4

| | Fuel consumption (km/lit) | CO (g/km) | HC (g/km) | NOx (g/km) | $CO_2$ (g/km) |
|---|---|---|---|---|---|
| Apparatus unloaded | 17.561 | 2.531 | 0.098 | 0.301 | 131.1 |
| Apparatus loaded | 18.676 | 2.734 | 0.114 | 0.234 | 122.6 |
| Difference | +1.115 | +0.203 | +0.016 | -0.067 | -8.5 |
| Result | +6 % (improved) | +8.02 % (increased) | +16.32 % (increased) | -22.26 % (decreased) | -6.483 % (decreased) |

LIQUID FUEL REFORMING APPARATUS

BACKGROUND OF THE INVENTION

1. Field of the Invention

The present invention relates to a liquid fuel reforming apparatus, more particularly to a liquid fuel reforming apparatus which can reform, for example, liquid fuels to be employed in internal combustion engines such as gasoline engine, combustion apparatuses for boilers, etc. or gaseous fuels such as liquefied natural gases (LNG) so as to improve combustion efficiency in the internal combustion engines and combustion apparatuses, as well as, to reduce nitrogen compounds (NOx) contained in the exhaust gases.

2. Description of the Related Art

Various means for achieving substantially complete combustion of gasoline in a gasoline engine loaded on an automobile have so far been proposed. These means are intended to improve fuel consumption efficiency and to decrease nitrogen compounds (NOx) contained in the exhaust gases. For example, there is known a fuel consumption improving apparatus consisting of a plurality of permanent magnet pieces arranged annularly at predetermined intervals around a fuel feeding pipe through which gasoline is force-fed from a tank by a pump to a carburetor. According to this fuel consumption improving apparatus, the molecular arrangement of gasoline flowing through the pipe is modified by the magnetic field induced by these permanent magnet pieces to effect so-called activation of the gasoline whereby to achieve improvement of fuel consumption. Meanwhile, there are some other means appearing on the market advertising that they can give excellent ignition sparking and can improve gasoline combustion efficiency by merely winding a special band around the joint between a high-tension cord extended from an ignition coil and an engine ignition plug.

However, in fact, these fuel consumption improving apparatuses described above do not exhibit as much effects as the proposers thereof assert, nor significant improving effect is experimentally demonstrated. For example, it can be surmised that in the latter means consisting of permanent magnet pieces arranged annularly around the fuel feeding pipe, the magnetic field induced by the permanent magnet pieces is acted upon the gasoline to spin electrons on the molecular level so as to modify the molecular arrangement and effect activation of the fuel. However, the magnetic field induced by the permanent magnet pieces is exerted to the gasoline indirectly from the outside of the fuel feeding pipe, and further the direction of the magnetic field is fixed. Accordingly, the magnetic field does not seem to be powerful enough to modify the molecular arrangement. Further, referring to the former means which is a special band wound around the ignition plug, the reason why such means can increase combustion efficiency remains absolutely unelucidated, and no significant data is obtained, as might be expected.

SUMMARY OF THE INVENTION

It is an objective of the present invention to provide a liquid fuel reforming apparatus capable of reforming liquid fuels, which has been unattainable by any of the prior art fuel consumption improving apparatuses, so as to improve combustion efficiency in internal combustion engines or combustion apparatuses and realize improvement of fuel consumption, as well as, reduce nitrogen compounds (NOx) contained in exhaust gases.

In order to overcome the problems inherent in the prior art and suitably attain the intended objective of the present invention, the liquid fuel reforming apparatus according to the present invention comprises a bobbin main body containing a fuel passage through which a liquid fuel such as gasoline and a combustible gas passes; a coil having a predetermined number of winding formed around the bobbin main body; and a multi-faced magnetic metal material sealed in the fuel passage, which permits passage of the liquid fuel being brought into contact therewith; wherein the liquid fuel is adapted to be reformed by applying a predetermined voltage across the coil to induce a magnetic field and effect magnetization of the multi-faced magnetic metal material contained in the fuel passage and by allowing the liquid fuel to flow through the fuel passage in contact with the magnetized multi-faced magnetic metal material.

Likewise, in order to overcome the problems inherent in the prior art and suitably attain the intended objective of the present invention, the liquid fuel reforming apparatus according to the present invention comprises a bobbin main body containing a fuel passage through which a liquid fuel such as gasoline and a combustible gas passes; a coil having a predetermined number of winding formed around the bobbin main body; and a multi-faced amorphous metal material sealed in the fuel passage, which permits passage of the liquid fuel being brought into contact therewith; wherein the liquid fuel is adapted to be reformed by applying a predetermined voltage across the coil to induce a magnetic field and effect magnetization of the multi-faced amorphous metal material contained in the fuel passage and by allowing the liquid fuel to flow through the fuel passage in contact with the magnetized multi-faced amorphous metal material.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

FIG. 4 is a table showing results of fuel consumption test carried out using a magnetizing apparatus utilizing an amorphous metal.

DETAILED DESCRIPTION OF THE PREFERRED EMBODIMENT

Figure 1:
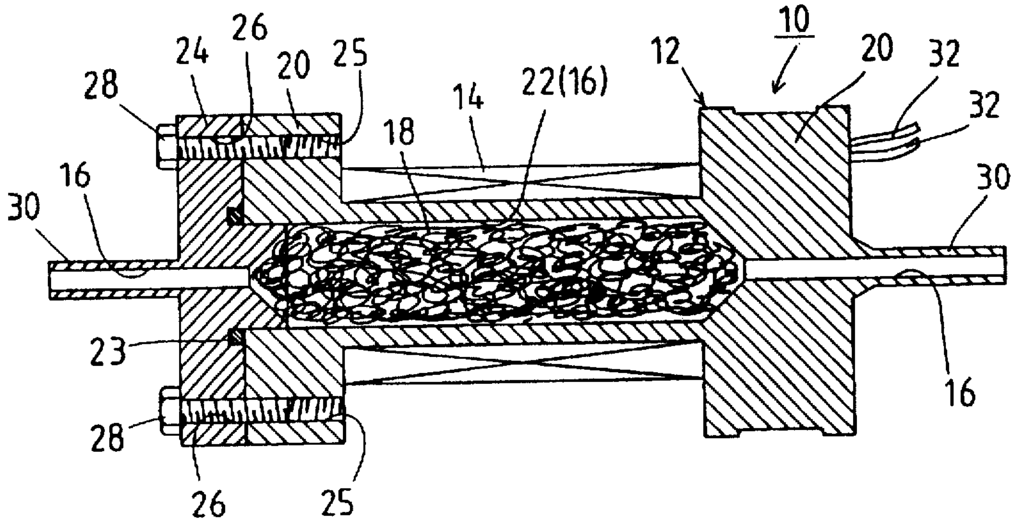
FIG. 1 is a longitudinal cross-sectional view of the liquid fuel reforming apparatus according to a preferred embodiment of the present invention.
Figure 2:
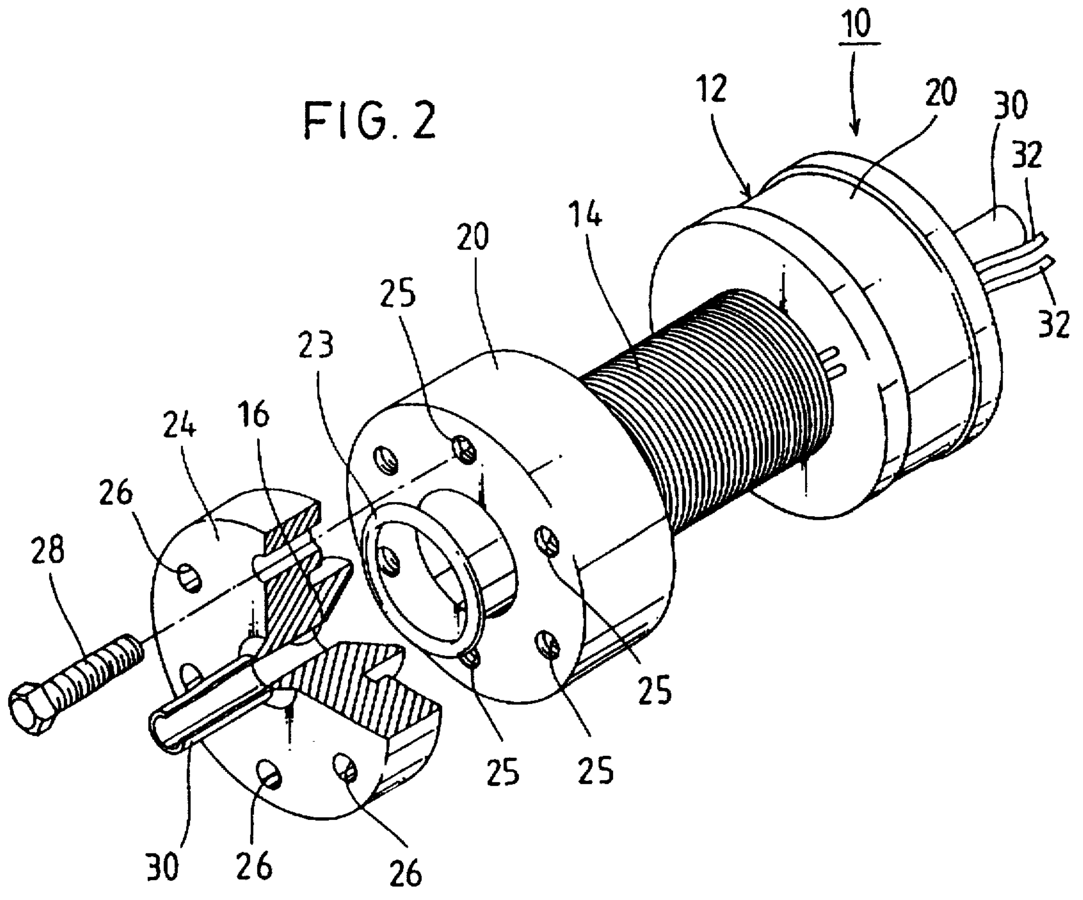
FIG. 2 is a partly cut-away perspective view of the liquid fuel reforming apparatus shown in FIG. 1.

A preferred embodiment of the present invention will be described below referring to the attached drawings. In the preferred embodiment, the reforming apparatus employing a multi-faced amorphous metal material is attached to a gasoline engine. FIG. 1 shows a longitudinal cross-sectional view of a liquid fuel reforming apparatus 10 according to the preferred embodiment of the invention. The reforming apparatus 10 basically consists of a cylindrical bobbin main body 12 made of a nonmagnetic material, a coil 14 wound around the bobbin main body 12, a fuel passage 16 defined through the bobbin main body 12 and a multi-faced amorphous metal material 18 sealed in the fuel passage 16 to permit a liquid fuel to flow through the passage 16 being brought into contact with the multi-faced amorphous metal material 18. More specifically, the bobbin main body 12 is made of a nonmagnetic material such as a rigid synthetic resin and has a pair of flanges 20 having a predetermined diameter at each longitudinal end thereof A through hole serving as a fuel passage 16, which permits passage of a liquid fuel such as gasoline and a combustible gas, is defined through the bobbin main body 12 along the axis thereof. The liquid passage 16 has an expanded portion (chamber) 22 substantially at the middle, in which the multi-faced amorphous metal material 18 (to be describe later) is contained.

Figure 3:
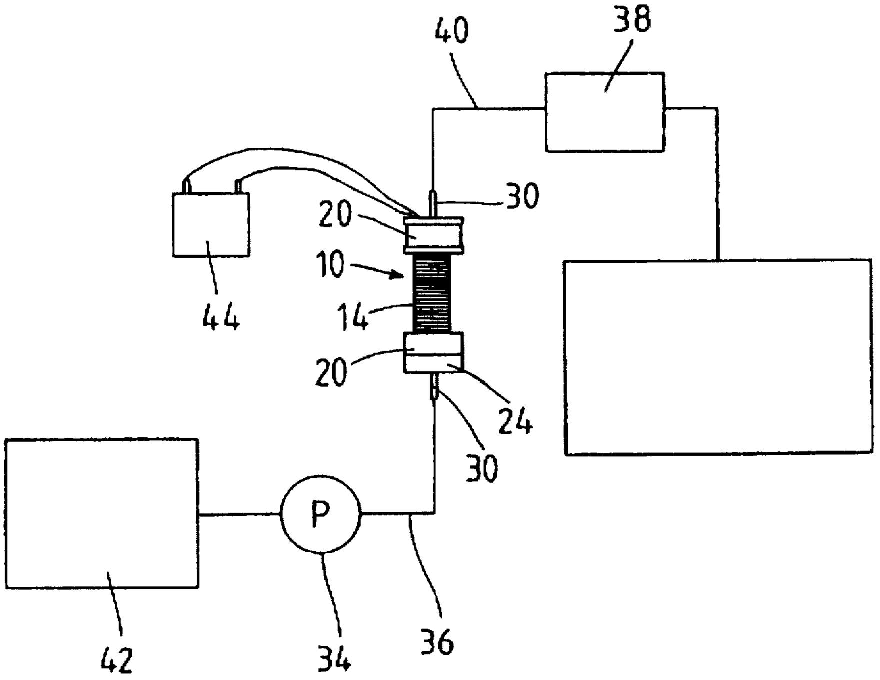
FIG. 3 is an explanatory view showing a state where the liquid fuel reforming apparatus shown in FIG. 1 is connected to a fuel supply system of an automotive engine.

Therefore, in order to facilitate procedures of introducing the multi-faced material 18 into the chamber 22, one of the flanges 20 is preferably provided with a separable lid 24 which is detachable with respect to the open end face of that flange 20. A seal ring 23 having high oil erosion resistance is applied to the separable lid 24 so as to secure liquid tightness with respect to the chamber 22. The open end face of that flange 20 contains a plurality of female screws 25 arranged in the circumferential direction at predetermined central angular intervals, while the fitting face of the separable lid 24 also contains a plurality of through holes 26 arranged in the circumferential direction at predetermined central angular intervals. The separable lid 24 can be securely fixed to the flange 20 by screwing bolts 28 into the corresponding female screws 25 and through holes 26, respectively. The separable lid 24 and the other flange 20 each has a nipple 30, communicating to the fuel passage 16, to protrude therefrom outward in the axial direction. These nipples 30 are connected to a pipe 36 communicating to the outlet side of a fuel pump 34 (to be described later) and to a pipe 40 communicating to the inlet side of a carburetor 38, respectively (see FIG. 3).

Over the zone between the flanges 20 on the cylindrical circumference of the bobbin main body 12, is wound, for example, an insulated copper wire having a diameter of 0.5 mm about 2000 times to constitute the coil 14. Lead wires 32 are extended from the winding head end and winding tail end of the coil 14, and they are to be connected to a predetermined DC or AC power source. For example, a DC voltage of about 12 V is applied across the coil 14, or an AC voltage of about 12 V is applied as necessary across the coil 14.

A multi-faced material 18, for example, of an amorphous metal is contained in the expanded portion (chamber) 22 of the fuel passage 16. In order to introduce the multi-faced amorphous metal material 18 into the chamber 22, the separable lid 24 is removed from the flange 20 of the bobbin main body 12 to open the chamber 22, as described above, and after a necessary amount of the multi-faced amorphous metal material 18 is introduced into the chamber 22, the separable lid 24 is applied to the open end face of the flange 20, followed by screwing of the bolts 28 into the corresponding female screws 25 and through holes 26, respectively, to fix the lid 24.

The amorphous metal is preferably selected from those which have high magnetic permeability and excellent erosion resistance and suitably includes those containing Fe, Ni, Si, Co, B, Cr, etc. For example, Am-Fe73Si10B12 employed as an iron core material, Am-Fe3Co70Si10B15 suitably employed as a high magnetic permeability material, etc. can be used. As the multi-faced amorphous metal material 18, a random aggregate of crumpled amorphous metal ribbon can be suitably employed. Alternatively, the multi-faced amorphous metal material 18 may be a random aggregate of crumpled reticular knitting of amorphous metal filaments.

The multi-faced amorphous metal material 18 used in the above embodiment may be replaced with a multi-faced magnetic metal material 18. As the magnetic metal, for example, a ribbon of iron-containing metal having an erosion-resistant plating is employed. More preferably, the magnetic metal is selected from those which have high magnetic permeability and excellent erosion resistance. In this case, as the multi-faced magnetic metal material 18, a random aggregate of crumpled magnetic metal ribbon can be suitably employed. Alternatively, the multi-faced magnetic metal material 18 may be a random aggregate of crumpled reticular knitting of magnetic metal filaments.

Next, an actual use of the reforming apparatus according to the embodiment will be described. A predetermined amount of multi-faced amorphous metal material 18 is introduced beforehand into the fuel passage 16 of the bobbin main body 12 constituting the reforming apparatus. The nipples 30 of the bobbin main body 12 are connected to the pipe 36 communicating to the outlet side of the fuel pump 34 and to the pipe 40 communicating to the inlet side of the carburetor 38, respectively. Accordingly, gasoline, which is force-fed from a fuel tank 42, by the fuel pump 34 through the pipe 36, passes through the fuel passage 16 defined in the bobbin main body 12 and then fed through the pipe 40 to the carburetor 38. In this process, the gasoline flowing through the fuel passage 16 is brought into intimate contact with the multi-faced amorphous metal material 18. Meanwhile, the coil 14 wound around the bobbin main body 12 is connected via the lead wires 32 to an on-vehicle battery 44, which applies a DC voltage of 12 V across the coil 14. The 12 V DC voltage may be converted into an alternate current employing a converter to apply a predetermined voltage of alternate current across the coil 14. It should be noted here that, when the gasoline is to be fed to a gasoline engine and burned therein, as described above, the revolution of the engine may be detected by a sensor to convert the direct current supplied from the on-vehicle battery 44 to an alternate current having a frequency synchronous to the revolution detected by the sensor and then to apply the AC voltage across the coil 14. Further, the DC voltage or the AC voltage applied across the coil 14 may be adapted to be interrupted at regular or random intervals by a suitable switching circuit interposed between the battery 44 and the coil 14.

A magnetic field is induced by applying a predetermined DC voltage across the coil 14, and the magnetic field acts upon the multi-faced amorphous metal material 18 contained in the expanded portion (chamber) 22 of the fuel passage 16 to powerfully magnetize the material 18. If the gasoline is force-fed by the fuel pump 34 to the bobbin main body 12 in this state, the gasoline flows in contact with the powerfully magnetized multi-faced amorphous metal material 18 and reformed thereby. More specifically, it can be considered that the gasoline flowing through the fuel passage 16 is exposed to magnetic actions exerted from many directions, when brought into direct contact with the magnetized multi-faced amorphous metal material 18, and thus the carbon-hydrogen bonds constituting the gasoline become unstable to release ions (so-called ionization).

This ionization improves (activates) bonding of the gasoline with oxygen when it is burned in the engine, to enable substantially complete combustion of the gasoline. If the gasoline is burned substantially completely, not only explosive force in the cylinders can be increased but also discharge pressure can be lowered, also reducing nitrogen compounds (NOx) contained in the exhaust gas. The increase in the explosive force brings about increase in the engine horse power and in the torque. Meanwhile, the reduction in the discharge pressure brings about reduction in the resistance of discharge gas in a muffler and increase in response or impact when an accelerator is stepped on, allowing the engine to exhibit the maximum engine performance. It should be noted that while significant effects can be recognized, as data of Test Example (to be described later) show, by loading the reforming apparatus according to the present invention, the reason why liquid fuels such as gasoline can be reformed is not theoretically elucidated yet. Accordingly, the description referring to the ionization is based on an assumption and is not necessarily a theoretically elucidated result.

TEST EXAMPLE

The reforming apparatus according to the present invention was tested under the following conditions, and the results are summarized in FIG. 4.

Place of test: Nissan Koki Kabushiki-Kaisha
Date: Jan. 31, 1995
Test mode: chassis dynamometer
Tested on: March,
manufactured by Nissan Motor Co., Ltd.
(Vehicle Serial No. K10-806209)
Engine model: MA10S
Transmission: Three-step automatic transmission
Driving mode: 10 to 15 mode driving
Gasoline: Lead-free
Current: DC 12 V This test clearly demonstrated that not only improvement of combustion efficiency and reduction of fuel consumption in the gasoline engine can be achieved, but also nitrogen compounds (NOx) contained in the exhaust gas can be reduced. The liquid fuel to be reformed by the apparatus of the present invention is not limited to petroleum liquid fuels such as gasoline and light gas oil, but the reforming apparatus can be applied for reforming alcoholic liquid fuels and gaseous fuels such as natural gases and coal carbonization gas to exhibit similar effects. Further, use of the reforming apparatus of the present invention in a combustion apparatus etc. such as a boiler can achieve complete combustion of liquid fuels such as heavy oil and gaseous fuels such as natural gases to achieve improvement of combustion efficiency, reduction of fuel consumption and reduction of nitrogen compounds (NOx) contained in the exhaust gas.

The reforming apparatus according to the present invention is useful not only for reforming liquid fuels, but also for reforming water, aqueous solutions and various kinds of other solutions. For example, when a predetermined voltage is applied across the coil 14 while water is passed through the reforming apparatus 10, the water flowing through the apparatus 10 being brought into contact with the multi-faced amorphous metal material comes to have an increased pH level and smaller water molecule clusters. Accordingly, permeability of the water is increased, so that the thus treated water can be employed as a water for removing scales deposited on the inner wall surface of water piping of a boiler, a laundry water, a dish-washing water, a semiconductor cleaning water, a bathing water or a raw water for preparing chemical solutions etc. Further, alcoholic and nonalcoholic beverages and other aqueous solutions can be reformed by passing them through the reforming apparatus, and thus these solutions likewise come to have increased pH levels and smaller water molecule clusters. Therefore, the thus reformed alcoholic and nonalcoholic beverages and other aqueous solutions enjoy a merit in that they can be absorbed extremely well in human bodies and other animals or plants.

Although only one embodiment of the present invention has been described herein, it should be apparent to those skilled in the art that the present invention may be embodied in many other specific forms without departing from the spirit or scope of the invention. Therefore, the present examples and the embodiment are to be considered as illustrative and not restrictive, and the invention is not to be limited to the details given herein, but may be modified within the scope of the appended claims.

What is claimed is:

1. A liquid fuel reforming apparatus comprising:

a bobbin main body containing a fuel passage through which a liquid fuel such as gasoline and a combustible gas passes;

a coil having a predetermined number of windings formed around the bobbin main body; and a multi-faced magnetic metal material sealed in the fuel passage, which permits passage of the liquid fuel being brought into contact therewith; and wherein:

the liquid fuel is adapted to be reformed by applying a predetermined voltage across the coil to induce a magnetic field and effect magnetization of the multi-faced magnetic metal material contained in the fuel passage and by allowing the liquid fuel to flow through the fuel passage in contact with the magnetized multi-faced magnetic metal material:

the liquid fuel is supplied to an internal combustion engine to be burned therein; and an AC voltage having a frequency synchronous to the revolution of the internal combustion engine is applied across the coil.

2. The liquid fuel reforming apparatus according to claim 1, wherein the magnetic metal is selected from those having high magnetic permeability and excellent erosion resistance.

3. The liquid fuel reforming apparatus according to claim 1, wherein multi-faced magnetic metal material is a random aggregate of crumpled magnetic metal ribbon.

4. The liquid fuel reforming apparatus according to claim 1, wherein the multi-faced magnetic metal material 18 is a random aggregate of magnetic metal filaments.

5. The liquid fuel reforming apparatus according to claim 1, wherein the fuel passage is a through hole defined through the bobbin main body along the axis thereof and has an expanded portion for containing the multi-faced magnetic metal material formed substantially at the middle.

6. A liquid fuel reforming apparatus comprising:

a bobbin main body containing a fuel passage through which a liquid fuel such as gasoline and a combustible gas passes;

a coil having a predetermined number of windings formed around the bobbin main body; and a multi-faced amorphous metal material sealed in the fuel passage, which permits passage of the liquid fuel being brought into contact therewith; and wherein:

the liquid fuel is adapted to be reformed by applying a predetermined voltage across the coil to induce a magnetic field and effect magnetization of the multi-faced amorphous material contained in the fuel passage and by allowing the liquid fuel to flow through the fuel passage in contact with the magnetized multi-faced amorphous metal material;

the liquid fuel is supplied to an internal combustion engine to be burned; and an AC voltage having a frequency synchronous to the revolution of the internal combustion engine is applied across the coil.

7. The liquid fuel reforming apparatus according to claim 6, wherein the amorphous metal is suitably selected from metals having high magnetic permeability and excellent erosion resistance.

8. The liquid fuel reforming apparatus according to claim 6, wherein multi-faced amorphous metal material is a random aggregate of crumpled amorphous metal ribbon.

9. The liquid fuel reforming apparatus according to claim 6, wherein the multi-faced amorphous metal material 18 is a random aggregate of amorphous metal filaments.

10. The liquid fuel reforming apparatus according to claim 6 to 7, wherein the fuel passage is a through hole defined through the bobbin main body along the axis thereof and has an expanded portion for containing the multi-faced amorphous metal material formed substantially at the middle.

11. The liquid fuel reforming apparatus according to claim 2, 5 or 7, wherein a DC voltage is applied across the coil.

12. The liquid fuel reforming apparatus according to claim 2, 5 or 7, wherein an AC voltage is applied across the coil.

* * * * *